April 6, 1937.  T. H. MAYFIELD  2,076,205
CULTIVATOR STANDARD
Filed July 3, 1936   2 Sheets-Sheet 1
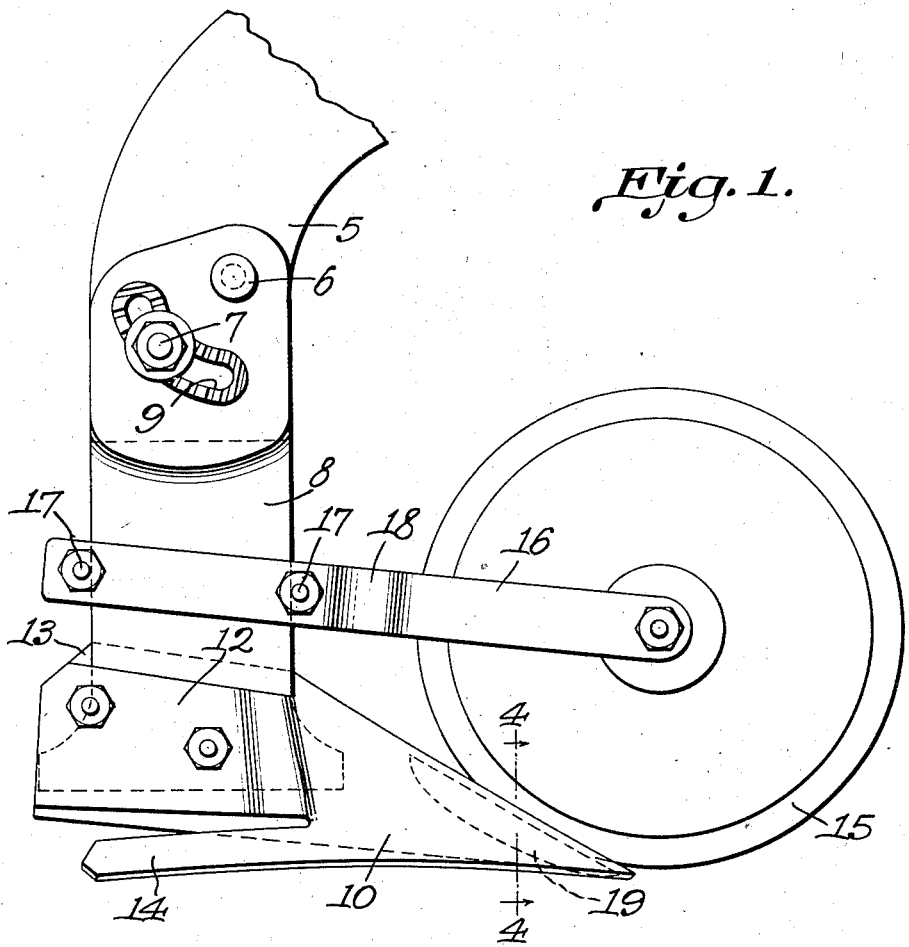
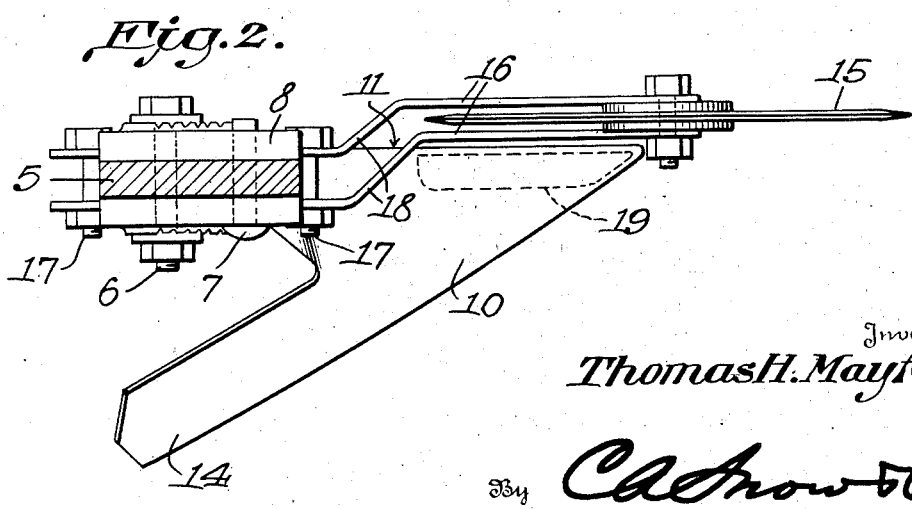
Inventor
Thomas H. Mayfield
By CA Snow & Co.
Attorneys.

April 6, 1937.  T. H. MAYFIELD  2,076,205
CULTIVATOR STANDARD
Filed July 3, 1936  2 Sheets-Sheet 2
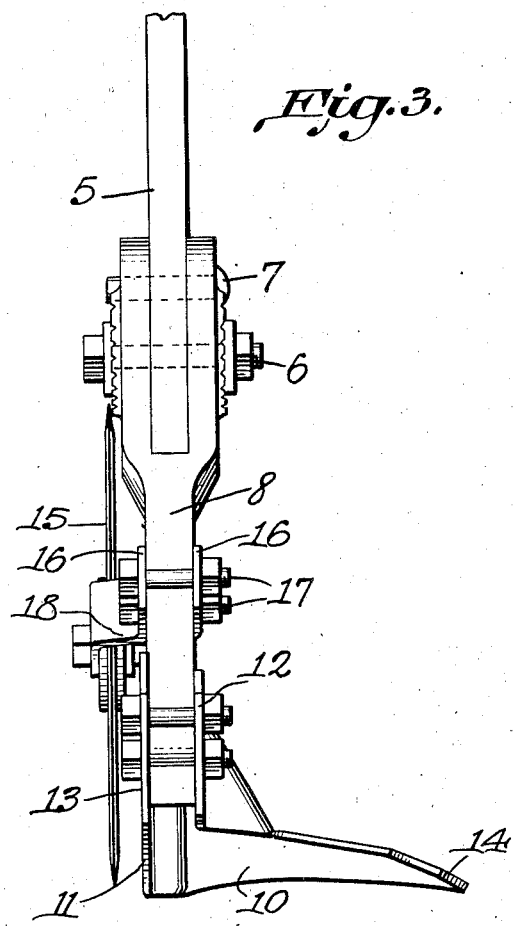
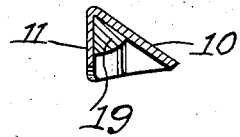
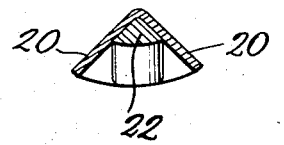
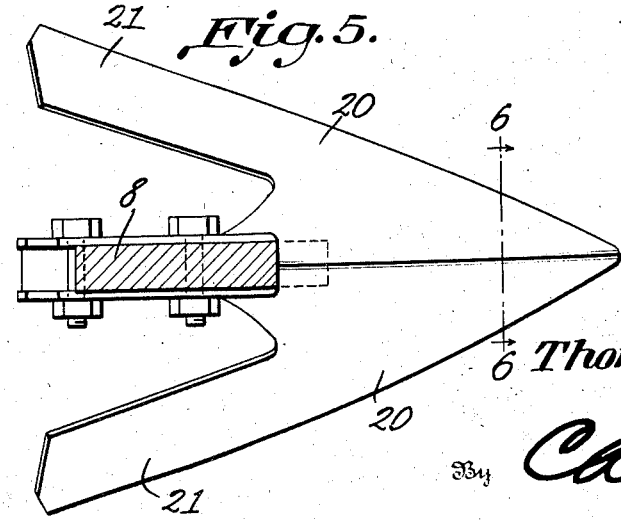
Inventor
Thomas H. Mayfield
By C. A. Snow & Co.
Attorneys Patented Apr. 6, 1937

2,076,205

UNITED STATES PATENT OFFICE 2,076,205

CULTIVATOR STANDARD

Thomas H. Mayfield, Roby, Tex.

Application July 3, 1936, Serial No. 88,881

2 Claims. (Cl. 97—207)

This invention relates to an attachment for use on cultivators having standards of the trip spring and slotted shank type.

An important object of the invention is to provide a cultivator blade attachment especially adapted for cultivating row crops, and of a construction to permit the cultivator to be run close to small growing plants, cultivating the soil in such a way that the moist soil will be protected and will not be exposed to the sun and air.

A further object of the invention is to provide a coulter, supported directly on the shank of the cultivator standard and with such relation to the blade of the cultivator that the coulter will cut vines, stubble, and roots in short lengths so that they cannot clog the shank or blade of the attachment.

A still further object of the invention is to provide a device of this character which may be readily and easily mounted on the standard of a cultivating machine of the well known construction, without the necessity of making alterations in the standard construction to accomplish the mounting of the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of an attachment constructed in accordance with the invention.

Figure 2 is a plan view thereof.

Figure 3 is a rear elevational view of the attachment, illustrating the relation between the blades and coulter.

Figure 4 is a sectional view taken on line 4—4 of Figure 1.

Figure 5 is a plan view of a modified form of the cultivator blade, the blade being of the double sweep type.

Figure 6 is a sectional view taken on line 6—6 of Figure 5.

Referring to the drawings in detail, the reference character 5 designates the standard of a cultivator beam which is provided with bolt openings to accommodate the bolts 6 and 7, which also extend through openings in the shank 8 of the attachment, the shank 8 being provided with an elongated opening 9 through which the bolt 7 extends, whereby the shank 8 may be moved to adjust the depth of operation of the blade.

The blade, as shown by Figure 1 of the drawings, is constructed for use in plowing close to small plants in rows, comprising a sweep 10 at one side thereof and a substantially straight side 11, the straight side being the side of the attachment operating adjacent to the plants. While the blade is shown as formed with a right hand sweep, it is of course understood that the blades may be constructed with left hand sweeps without departing from the spirit of the invention.

In the construction of the blade, spaced members 12 and 13 are provided, between which the shank 8 is bolted, and in constructing the outer member 12, the lower portion of the member 12 is cut away, providing a clearance, that portion of the member 12 adjacent to the body of the blade being curved inwardly so that the soil may pass upwardly over the body portion of the blade, and fall into the space between the extensions 14 of the blade and the member 13. Thus it will be seen that due to this construction the moist soil is protected, and is not turned over to be exposed to the sun and air.

Associated with the blade of the attachment and forming an important feature of the invention, is the coulter 15 that is mounted between the arms 16, at the forward ends thereof, the arms having their rear ends embracing a portion of the shank 8, where they are bolted together by means of the bolts 17. Due to the manner of securing these arms to the shank 8, the coulter may be adjusted vertically to operate in spaced relation with the soil.

As illustrated by Figure 2 of the drawings, the arms 16 are offset as at 18, from where they extend forwardly with the result that the coulter 15 supported by these arms, operates in a vertical plane and in spaced relation with the straight side of the attachment blade. It follows that when the device is in operation cultivating rows of growing plants, the coulter operates to cut vines, stubs, and roots in short lengths, prior to the passage of the blade under the vegetation, thereby eliminating any possibility of the blade or shank being clogged to impair the operation of the device. In order that the blade will be exceptionally strong at the pointed end thereof, the hollow portion of the blade is reinforced with a heavy metal indicated by the reference character 19.

In the form of the invention as shown by Figure 5 of the drawings, the blade is formed with a double sweep, the sweeps being indicated by the reference character 20. In this form of the invention, extensions 21 are formed which extensions are spaced appreciable distances from the shank of the cultivator, leaving openings so that the soil may fall rearwardly and will not be turned over to be exposed to the sun and air. The forward extremity of the blade is also reinforced with heavy rib indicated at 22.

Having thus described the invention, what is claimed is:

1. A cultivator attachment comprising a shank, a cultivator blade mounted on the shank, arms extending forwardly from the shank, a coulter mounted between the arms at the forward ends of the arms, said arms being offset with reference to the shank, whereby the coulter operates in lateral spaced relation with the blade to cut material in advance of the blade.

2. A cultivator attachment comprising a shank, a cultivator blade mounted on the shank, a pair of arms, secured to the shank above the cultivator blade and adjustable longitudinally of the shank, said arms being offset with respect to the shank, a coulter mounted between the arms at the forward ends of the arms, whereby the coulter operates in lateral spaced relation with respect to the blade, cutting material in advance of the blade.

THOMAS H. MAYFIELD.